US009003095B2

(12) United States Patent
Molnar et al.

(10) Patent No.: US 9,003,095 B2
(45) Date of Patent: Apr. 7, 2015

(54) AUTOMATION CONTROL COMPONENT

(75) Inventors: Nathan Joseph Molnar, Shaker Heights, OH (US); Douglas Robert Bodmann, Shaker Heights, OH (US); Terence Scott Tenorio, Solon, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 441 days.

(21) Appl. No.: 13/425,066

(22) Filed: Mar. 20, 2012

(65) Prior Publication Data

US 2013/0254447 A1  Sep. 26, 2013

(51) Int. Cl.
*H05K 7/10* (2006.01)
*G06F 13/14* (2006.01)

(52) U.S. Cl.
CPC ...................................... *G06F 13/14* (2013.01)

(58) Field of Classification Search
CPC .................................. H02B 1/52; G01R 11/04
USPC ........................................... 710/305; 361/641
See application file for complete search history.

(56) References Cited

U.S. PATENT DOCUMENTS

| 5,752,047 | A  | * | 5/1998 | Darty et al. ................... 713/300 |
| 6,901,316 | B1 | * | 5/2005 | Jensen et al. .................. 700/286 |
| 7,581,053 | B2 | * | 8/2009 | Sichner et al. ................ 710/300 |
| 7,930,042 | B2 | * | 4/2011 | El-Sayed ........................ 700/21 |
| 8,239,158 | B2 | * | 8/2012 | Crain et al. .................... 702/123 |
| 8,628,004 | B2 | * | 1/2014 | Vazach et al. ................. 235/375 |
| 2012/0176735 | A1 | * | 7/2012 | Davis ............................ 361/641 |

OTHER PUBLICATIONS

Rockwell Automation—Bulletin 1492 "Digital/Analog Programmable Controller Wiring Systems"; 196 pages, Dated Jan. 2009.*

* cited by examiner

*Primary Examiner* — Brian Misiura
(74) *Attorney, Agent, or Firm* — Fletcher Yoder, P.C.

(57) ABSTRACT

Embodiments of the present disclosure are directed toward an automation control device including a base having a module slot, a functional module including communication and control circuitry configured to communicatively couple with the base via the module slot, a terminal block configured to communicatively couple the base and the first functional module with field wiring, a first power bus configured to transmit a first power to the functional module, and a second power bus configured to transmit a second power to the functional module.

20 Claims, 5 Drawing Sheets

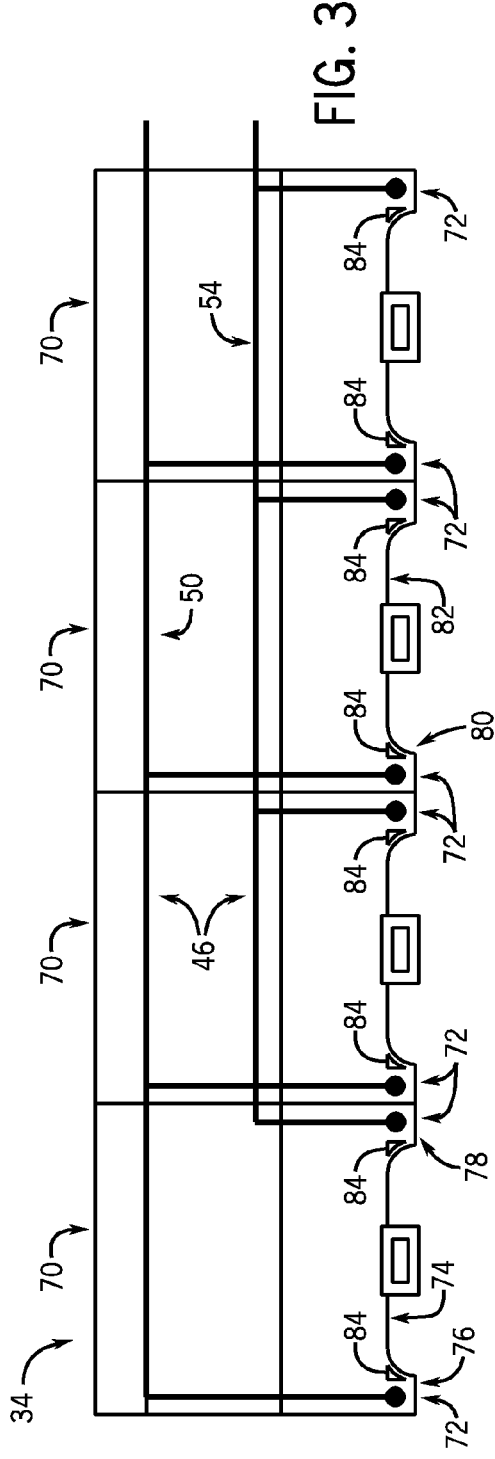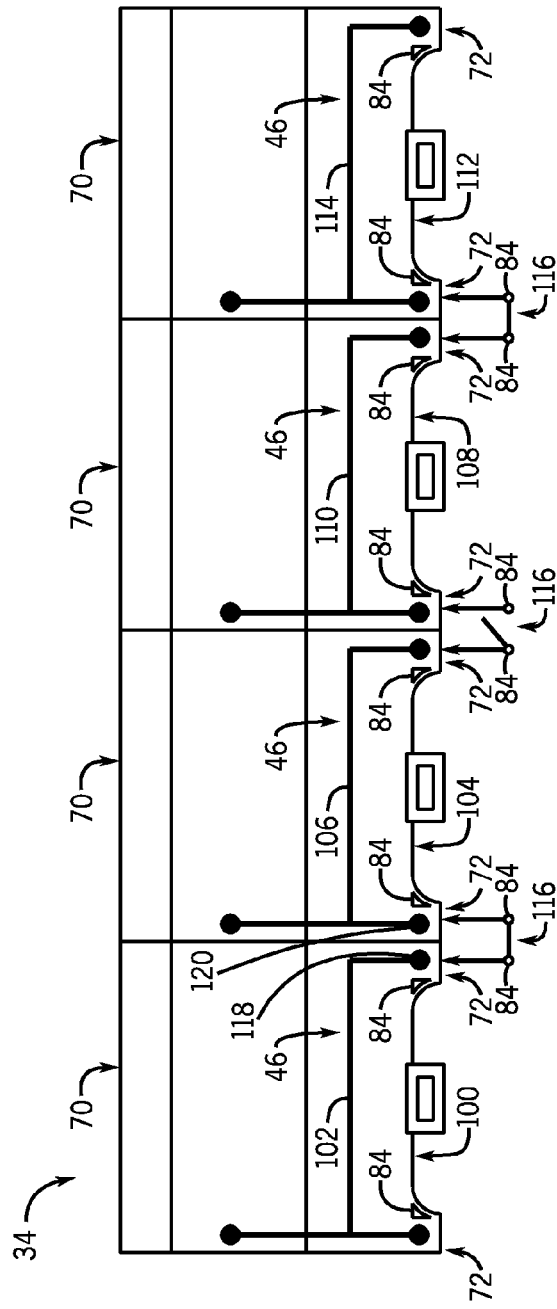

AUTOMATION CONTROL COMPONENT

BACKGROUND

The invention relates generally to the field of automation control systems, such as those used in industrial and commercial settings. More particularly, embodiments of the present invention relate to techniques for providing, configuring, and evaluating power for modular devices, such as input/output (I/O) devices, that are capable of coupling and interfacing with an automation controller in a modular automation control system.

Automation controllers are special purpose computers used for controlling industrial automation and the like. Under the direction of stored programs, a processor of the automation controller examines a series of inputs (e.g., electrical input signals to the automation controller) reflecting the status of a controlled process, and changes outputs (e.g., electrical output signals from the automation controller) based on analysis and logic for affecting control of the controlled process. The stored control programs may be continuously executed in a series of execution cycles, executed periodically, or executed based on events.

The automation controller may function with other modular components of a control system to facilitate control or monitoring of a particular process. For example, inputs received by the automation controller from the controlled process and the outputs transmitted by the automation controller to the controlled process are normally passed through one or more I/O devices, which are components of the associated automation control system. The I/O devices generally serve as an electrical interface between the automation controller and the controlled process. Specifically, such I/O devices typically include a base configured to communicatively couple with a bus bar or the like (such that electrical signals can be transmitted therebetween), a terminal block with terminals or channels for connecting with wiring from field devices, and an I/O module that facilitates communication of information from the field devices to other automation controller components.

Traditional automation control systems receive power from a power source (e.g., an electrical grid or battery) through field power distribution (FPD) modules, which are specialized modules for providing power to components of the automation control system. Depending on the size and nature of a particular automation control system, different levels and types of field power may be required. Indeed, as modules (e.g., I/O modules) are connected with a power bus of a modular automation controller system, the type or amount of power may need to be changed or augmented. For example, in traditional systems, a particular type of field power may be required for powering analog I/O, and a different type of field power may be required for powering discrete I/O. Accordingly, it is now recognized that it is desirable to provide a more flexible power distribution system that can accommodate multiple types of power.

BRIEF DESCRIPTION

In one embodiment, an automation control device includes a base having a module slot, a functional module including communication and control circuitry configured to communicatively couple with the base via the module slot, a terminal block configured to communicatively couple the base and the first functional module with field wiring, a first power bus configured to transmit a first power to the functional module, and a second power bus configured to transmit a second power to the functional module.

In a second embodiment, an automation control component includes a base configured to communicatively couple with a functional module that includes communication and control circuitry, a first power bus disposed within the base, and a second power bus disposed within the base.

In a third embodiment, an automation control component includes a base configured to communicatively couple with a system bus and configured to couple with a functional module that includes communication and control circuitry, a first functional module configured to communicatively couple with the base, and a terminal block configured to communicatively couple the base and the first functional module with field wiring. The automation control component further includes a first power bus configured to transmit a first power to the functional module, a second power bus configured to transmit a second power to the functional module, a first visual indicator configured to indicate a presence, type, and/or source of the first power, and a second visual indicator configured to indicate a presence, type, and/or source of the second power.

DRAWINGS

These and other features, aspects, and advantages of the present invention will become better understood when the following detailed description is read with reference to the accompanying drawings in which like characters represent like parts throughout the drawings, wherein:

FIG. 3 is a schematic of an embodiment of an I/O base having a plurality of power buses in accordance with embodiments of the present techniques;

FIG. 4 is a schematic of an embodiment of an I/O base having a plurality of power buses in accordance with embodiments of the present techniques;

DETAILED DESCRIPTION

Figure 1:
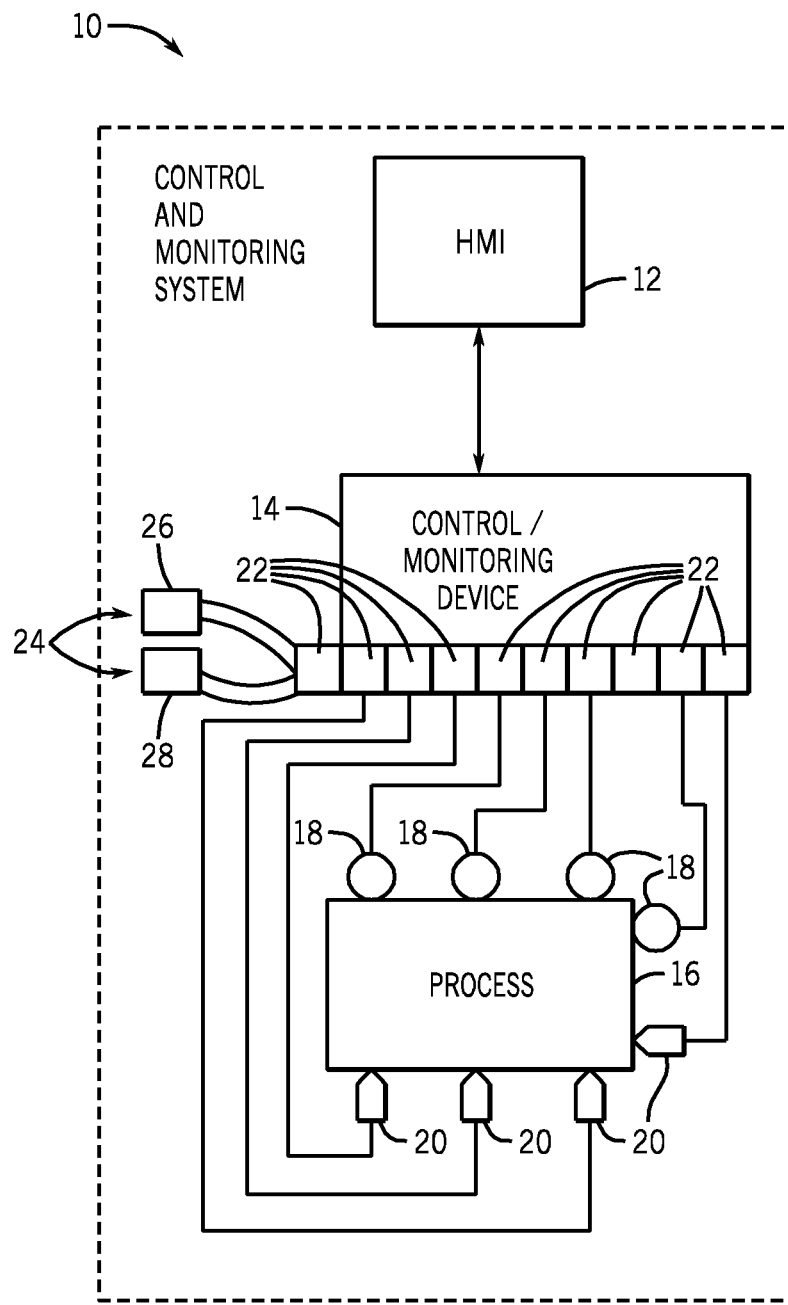
FIG. 1 is a diagrammatical representation of an exemplary control and monitoring system or automation controller system adapted to interface with networked components and configuration equipment in accordance with embodiments of the present techniques.

FIG. 1 is a diagrammatical representation of an exemplary control and monitoring system or automation controller system adapted to interface with networked components and configuration equipment in accordance with embodiments of the present techniques. The control and monitoring system of FIG. 1 includes components that have multiple power buses in accordance with present techniques. Specifically, certain units or devices of the control and monitoring system may include two or more power buses. Indeed, in accordance with present techniques, multiple types of power (e.g., AC power, DC power, etc.) may be used by a single module or device. For example, in one embodiment, an I/O base may include two power buses, which may provide two different types of power. In this manner, I/O modules or devices requiring different types of power may be used with the same I/O base. For example, an I/O base may have a first power bus which may provide DC power and a second power bus which may provide A/C power, thereby enabling the use of I/O modules or devices which require AC power and I/O modules or devices which require DC power with the I/O base. In other words, I/O modules or devices requiring different types of power may be used with the I/O base at the same time because the I/O base has two separate power buses providing different types of power.

In FIG. 1, the control and monitoring system 10 is generally indicated by reference numeral 10. Specifically, the control and monitoring system 10 is illustrated as including a human machine interface (HMI) 12 and a control/monitoring device or automation controller 14 adapted to interface with components of a process 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The process 16 may take many forms and include devices for accomplishing many different and varied purposes. For example, the process 16 may comprise a compressor station, an oil refinery, a batch operation for making food items, a mechanized assembly line, and so forth. Accordingly, the process 16 may comprise a variety of operational components, such as electric motors, valves, actuators, temperature elements, pressure sensors, or a myriad of manufacturing, processing, material handling and other applications. Further, the process 16 may comprise control and monitoring equipment for regulating process variables through automation and/or observation. For example, the illustrated process 16 comprises sensors 18 and actuators 20. The sensors 18 may comprise any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate process equipment. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

I/O assemblies 22 may be added or removed from the control and monitoring system 10 via expansion slots, bays or other suitable mechanisms. In certain embodiments, the I/O assemblies 22 may be included to add functionality to the control/monitoring device 14, or to accommodate additional process features (e.g., to communicate with new sensors 18 or actuators 20 added to control the process 16). The I/O assemblies 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

The control and monitoring system 10 includes input/output (I/O) assemblies 22 that may include two or more power buses, in accordance with present techniques. In the illustrated embodiment, several of the I/O assemblies 22 are configured to transfer input and output signals between the control/monitoring device 14 and the controlled process 16. As illustrated, the sensors 18 and actuators 20 may communicate with the control/monitoring device 14 via one or more of the I/O assemblies 22 coupled to the control/monitoring device 14. As discussed in further detail below, the I/O assemblies 22 may include two or more power buses, each of which may provide a different type of power (e.g., AC power, DC power, etc.). In this manner, each I/O assemblies 22 may be used with sensors 18 and actuators 20 that require different types of power (e.g., AC power, DC power, etc.).

Additionally, the I/O assemblies 22 may be configured to receive power from an external source 24 (e.g., an electrical grid or battery), and supply bus power to the other I/O assemblies 22. As similarly discussed above, because the I/O assemblies 22 may have two or more power buses, each I/O assembly 22 may receive power from two external sources 24 (e.g., a first external source 26 and a second external source 28) with each external source 24 providing a different type of power. Furthermore, in certain embodiments, power from a first power bus in the I/O assembly 22 may be jumped to a second power bus in the I/O assembly 22. That is, the first power bus of the I/O assembly 22 may provide power to the second power bus of the I/O assembly 22 via a jumper (e.g., a linear slider, a rotation beam and catch, plug-in jumper, integrated contacts, etc.) or other connection. Similarly, power may be jumped from a power bus of one I/O assembly 22 to a power bus of another I/O assembly 22. As described in further detail below, the I/O assemblies 22 may also include a power annunciation or feedback mechanism. More specifically, the I/O assemblies 22 may provide feedback indicating the type or types of power that are running through the I/O assemblies. In this manner, a user may be able to determine the types of modules and/or devices that may be used with the I/O assembly 22.

Figure 2:
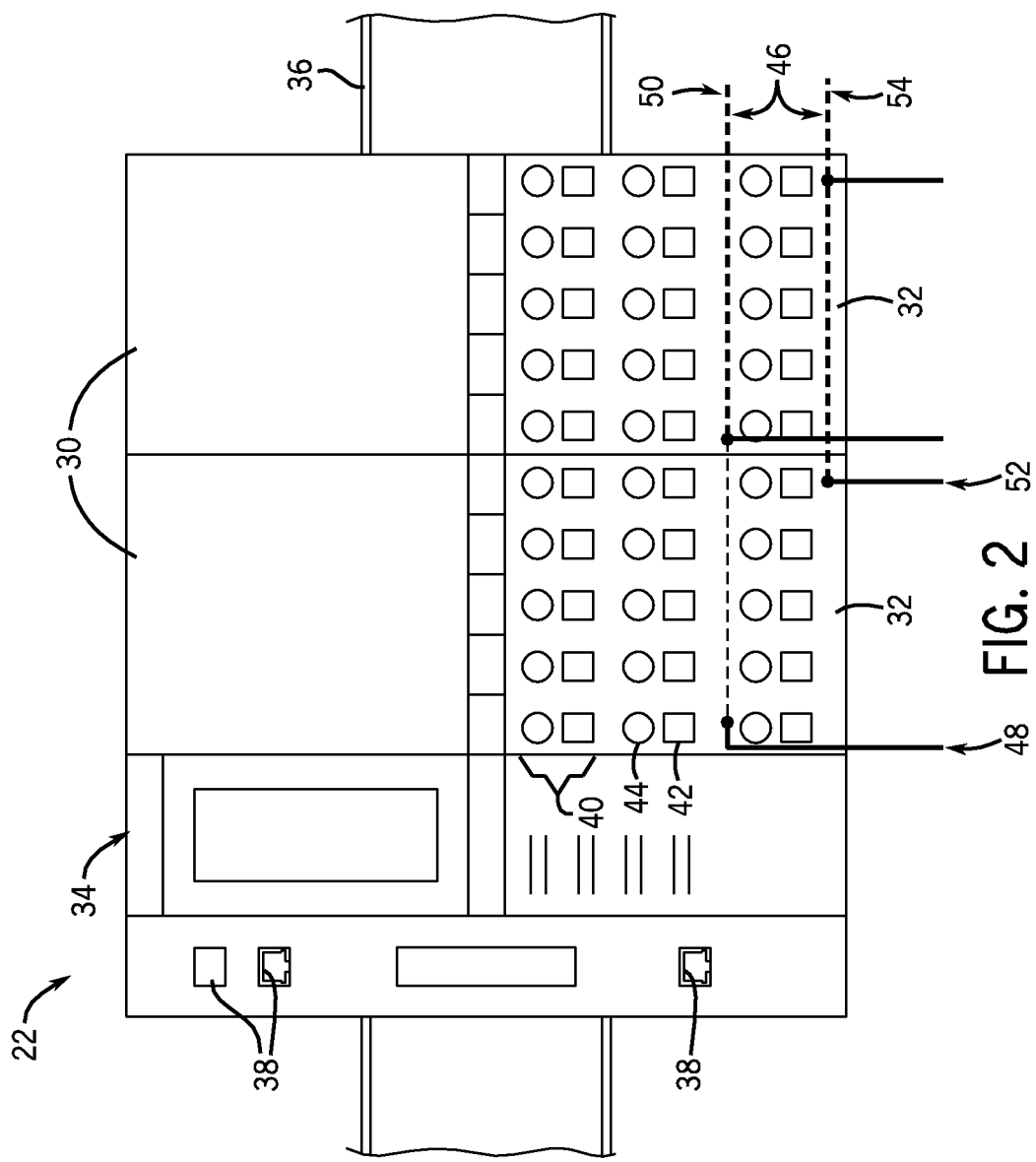
FIG. 2 is a front view of a plurality of I/O modules communicatively or electrically coupled to an I/O base in accordance with embodiments of the present techniques.

FIG. 2 is a front view of an embodiment of the I/O assembly 22, illustrating a plurality of I/O modules 30 and I/O terminal blocks 32 communicatively or electrically coupled to an I/O base 34 in accordance with embodiments of the present techniques. As illustrated, the I/O assembly 22 is mounted to a mounting rail (e.g., a DIN rail) 36, which is an industry standard support rail for mounting control equipment in racks and cabinets. In certain embodiments, the mounting rail 36 may also serve as a system bus, a bus bar, or other power bus system configured to supply power to the I/O assembly 22. As shown, I/O assembly 22 also includes communication ports 38 which may enable system information to be communicated between the I/O assembly 22 and the control/monitoring device 14.

The I/O terminal blocks 32 are physically and electrically coupled to the I/O base 34. In certain embodiments, the I/O terminal blocks 32 may be removable from the I/O base 34, thereby allowing the I/O terminal blocks 32 or the I/O base 34 to be replaced without the need for re-wiring. The I/O terminal blocks 32 are configured for electrically connecting the I/O assembly 22 to field devices (e.g., sensors 18 or actuators 20) or a power source (e.g., external source 24). Additionally, the I/O modules 30, which include communication and control circuitry (e.g., I/O communication circuitry, control circuitry, power distribution circuitry, and/or logic), are configured to communicate with the I/O terminal blocks 32. For example, the I/O modules 30 may be capable of receiving input signals from field devices via the I/O terminal blocks 32, delivering output signals to the field devices via the I/O terminal blocks 32, performing general and/or specific local functionality on the inputs and/or outputs, communicating the inputs and/or outputs to the control/monitoring device 14 and/or the other I/O assemblies 22, and so forth. It should be noted that, in some embodiments, the I/O modules 30 and/or I/O terminal blocks 32 may be integrated with the I/O base 34. In other words, the I/O base 34 and the I/O modules 30 may be combined into a single base component.

As illustrated, each terminal block 32 includes fifteen terminals 40 (i.e., channels) for connecting field device wiring or power source wiring. In operation, the terminals 40 may each be associated with a particular input to or output from a field device. As discussed in detail below, the terminal blocks 32 may also include dedicated terminals 40 (e.g., field power terminals) for use as a coupling to an external power source (e.g., a field power module to supply power). As illustrated, each terminal 40 includes a terminal opening 42 into which a field wire (i.e., wiring electrically connected to a field device) may be inserted, or a power source wire connected to a power source may be inserted. Further, each terminal 40 includes an attachment activator (e.g., a terminal screw) 44, which when activated (e.g., tightened) causes a clamp or other electrical wiring connection mechanism within the terminal block 32 to tighten around an end of a field wire or power source wire that has been inserted into the associated terminal opening 42.

As mentioned above, the I/O assembly 22 may include multiple power buses 46. For example, in the illustrated embodiment, the I/O assembly 22 receives a first source voltage 48 (e.g., from the external source 24) and provides power to one or more I/O modules 30 via a first power bus 50. Similarly, the I/O assembly 22 receives a second source voltage 52 and provides power to one or more I/O modules 30 via a second power bus 54, which is separate from the first power bus 50. In certain embodiments, the first and second power buses 50 and 54 may be integrated with the I/O base 34. In other embodiments, the first and second power buses 50 and 54 may be integrated with another component of the I/O assembly 22. For example, the first source voltage 48 may be a DC voltage, and the second source voltage 52 may be an AC voltage. In this manner, two different types of voltage may be supplied to the I/O assembly 22. That is, one type of power may be supplied to the first power bus 50 and a different type of power may be supplied to the second power bus 54. Consequently, I/O modules 30 requiring AC power or DC power may both be coupled to the I/O base 34 and used with the I/O assembly 22. Additionally, I/O modules 30 using both AC power and DC power may be used with the I/O assembly 22.

FIG. 3 is a schematic of an embodiment if the I/O base 34, illustrating the first and second power buses 50 and 54 integrated with the I/O base 34. As mentioned above, other embodiments of the I/O base 34 may includes more than two power buses 46. The I/O base 34 includes multiple module bays or slots 70 in which the I/O modules 30 may be disposed and coupled to the I/O base 34. As shown, the first and second power buses 50 and 54 extend through each of the module slots 70. In this manner, the I/O modules 30 disposed within the module slots 70 may access two different types of power. That is, the I/O modules 30 may access a first type of power from the first power bus 50 and a second type of power from the second power bus 54. For example, in one embodiment, the first power bus 50 may carry a DC voltage, and the second power bus 54 may carry an AC voltage. In another embodiment, the first power bus 50 may carry a high DC voltage, and the second power bus 54 may carry a low DC voltage. As will be appreciated, the I/O modules 30 used with the I/O base 34 may be configured to accept only the power type needed (i.e., AC power, DC power, both, etc.).

Furthermore, each module slot 70 of the I/O base 34 includes power terminals 72. In the illustrated embodiment, each module slot 70 has two power terminals 72, however, other embodiments of the I/O base 34 may include module slots 70 with more power terminals 72. Each power terminal 72 is electrically coupled to one of the power buses 46 extending through the I/O base 34. More specifically, each power terminal 72 of each module slot 70 is electrically coupled to a different power bus 46 extending through the I/O base 34. For example, in the illustrated embodiment, a first module slot 74 includes a first power terminal 76 and a second power terminal 78, where the first power terminal 76 is electrically coupled to the first power bus 50 and the second power terminal 78 is electrically coupled to the second power bus 54. Similarly, in the illustrated embodiment, each module slot 70 of the I/O base 34 includes two power terminals 72 where one power terminal 72 is electrically coupled to the first power bus 50 and the other power terminal 72 is coupled to the second power bus 54. In this manner, multiple types of field power may be supplied to each module slot 70, and therefore each I/O module 30 of the I/O base 34. For example, each I/O module 30 of the I/O base 34 may be configured to receive power from the first power bus 50, the second power bus 54, or both the first power bus 50 and the second power bus 54. In other embodiments, other components of the I/O assembly 22 may include the power terminals 72 which couple to the power buses 46 of the I/O base 34 or I/O assembly 22. For example, the terminal blocks 32 may include the power terminals 72.

As discussed, power may be supplied to the power buses 46 through the power terminals 72. For example, a field power module or other external source 24 may be coupled the first power terminal 76 of the first module slot 74 to provide power to the first power bus 50. Similarly, a separate field power module or external source 24 may be coupled to the second power terminal 78 of the first module slot 74 to provide power to the second power bus 54. Alternatively, power may be supplied to the power buses 46 through alternative sources. For example, power may be supplied to one of the power buses 46 from the mounting rail (e.g., DIN rail) 30, as mentioned above, or from a power supply in the control and monitoring system 10. Furthermore, the transmission of power through the power buses 46 may be breakable. For example, if power is supplied to the first power bus 50 through the first power terminal 76 of the first module slot 74, the transmission of the power through the first power bus 50 may be broken by coupling a field power unit to another power terminal 72 electrically coupled to the first power bus 50 (e.g., a first power terminal 80 of a third module slot 82). This facilitates customization based on desired power supply availability.

The I/O base 34 further includes a power annunciation system configured to communicate the presence, type, and/or use of power in the power buses 46. More specifically, the I/O base 34 may include power detection circuitry which may determine various properties of the power being transmitted by each power bus 46, such as the type of power, whether the power is landed, the level of power, the source of power, and so forth. As shown, each module slot 70 includes a visual indicator 84 adjacent to each power terminal 72. In certain embodiments, the visual indicator 84 may be a light, such as a light emitting diode (LED). The visual indicator 84 may provide feedback to a user regarding the various properties of the power being transmitted by one of the power buses 46 based on information provided by the power detection circuitry or simply based on power availability. In one embodiment, the visual indicator 84 may provide an indication (e.g., color, flashing, intensity) of the type of power being transmitted by one of the power buses 46. For example, in an embodiment where the visual indicator 84 is an LED, the visual indicator 84 may be colored blue when a DC voltage is being transmitted by the power bus 46, and the visual indicator 84 may be colored red when an AC voltage is being transmitted by the power bus 46. In another embodiment, the visual indicator 84 may provide an indication of the electrical potential of the power being transmitted by one of the power buses 46. For example, in an embodiment where the visual indicator 84 is an LED, the visual indicator 84 may have a first luminosity (e.g., brightness) for when a high DC voltage is being transmitted by the power bus 46, and the visual indicator 84 may have a second luminosity (e.g., brightness) when a low DC voltage is being transmitted by the power bus 46. In this manner, a user may easily be able to determine the presence, source, and/or type of power being supplied to each I/O module slot 70 and, therefore, each I/O module 30 disposed within each I/O module slot 70. Furthermore, the visual indicators 84 may be configured to indicate the absence of power and/or the presence of a wrong type of power. For example, if one of the I/O modules 30 coupled to the module slot 70 of the I/O base 34 is configured to receive a certain type of power, the visual indicators 84 of that module slot 70 may be configured to provide a visual indication of the absence of the required type of power and/or the presence of a different type of power that is not required for the particular I/O module 30.

FIG. 4 is a schematic of an embodiment of the I/O base 34, illustrating multiple power buses 46 integrated with the I/O base 34. More specifically, there is a separate power bus 46 associated with each module slot 70. In other words, a first module slot 100 has a first power bus 102, a second module slot 104 has a second power bus 106, a third module slot 108 has a third power bus 110, and a fourth module slot 112 has a fourth power bus 114. As similarly discussed above, each power bus 46 may transmit a different type of power. For example, the first power bus 102 may transmit high DC voltage, the second power bus 106 may transmit low DC voltage, and so forth. In this manner, the I/O base 34 may provide multiple different types of power, thereby enabling the use of I/O modules 30 requiring different types of power with the same I/O base 34.

Furthermore, in the illustrated embodiment, power may be jumped from one power bus 46 to another power bus 46. For example, power may be jumped from the first power bus 102 to the second power bus 106 using a jumper 116. As mentioned above, the jumper 116 may be a linear slider, rotating beam and catch, plug-in jumper, integrated contacts, and so forth. In certain embodiments, the jumper 116 may be plugged into power terminals 72 of the I/O base 34. For example, to jump power from the first module slot 100 (i.e., from the first power bus 102) to the second module slot 104 (i.e., to the second power bus 106) the jumper 116 may be plugged into a power terminal 118 of the first module slot 100 and a power terminal 120 of the second module slot 104. As shown, the jumpers 116 may also include visual indicators 84 configured to provide power annunciation to a user, in the manner described above.

Figure 5:
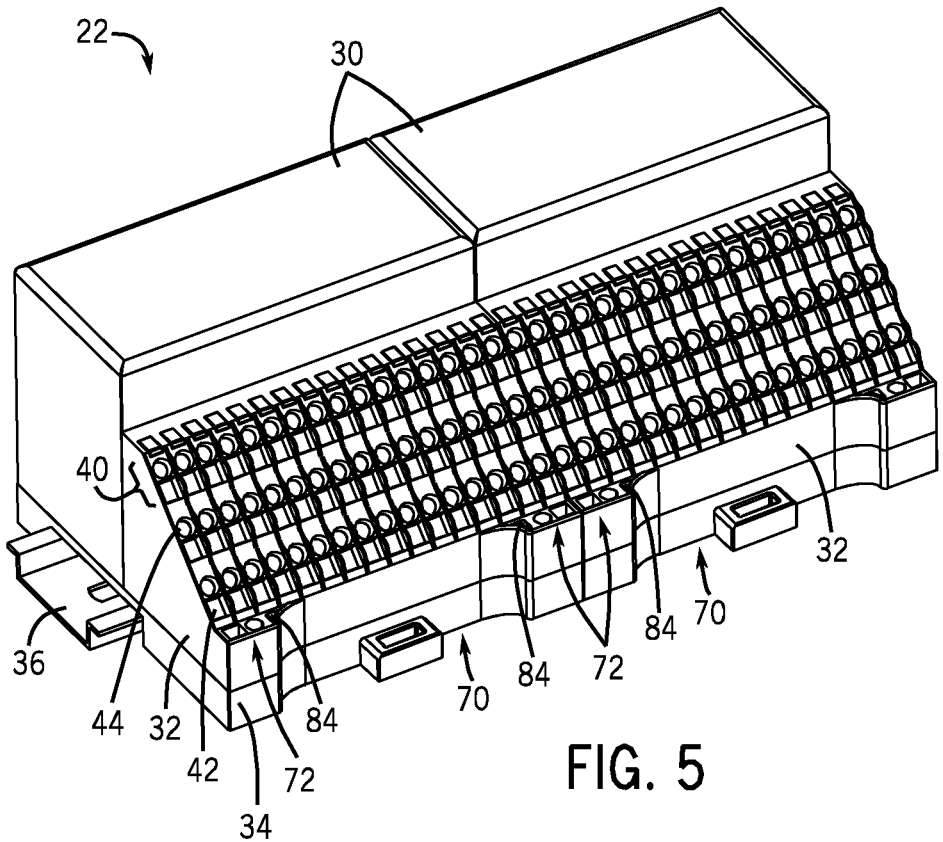
FIG. 5 is a perspective view of a plurality of I/O modules communicatively or electrically coupled to an I/O base in accordance with embodiments of the present techniques.
Figure 6:
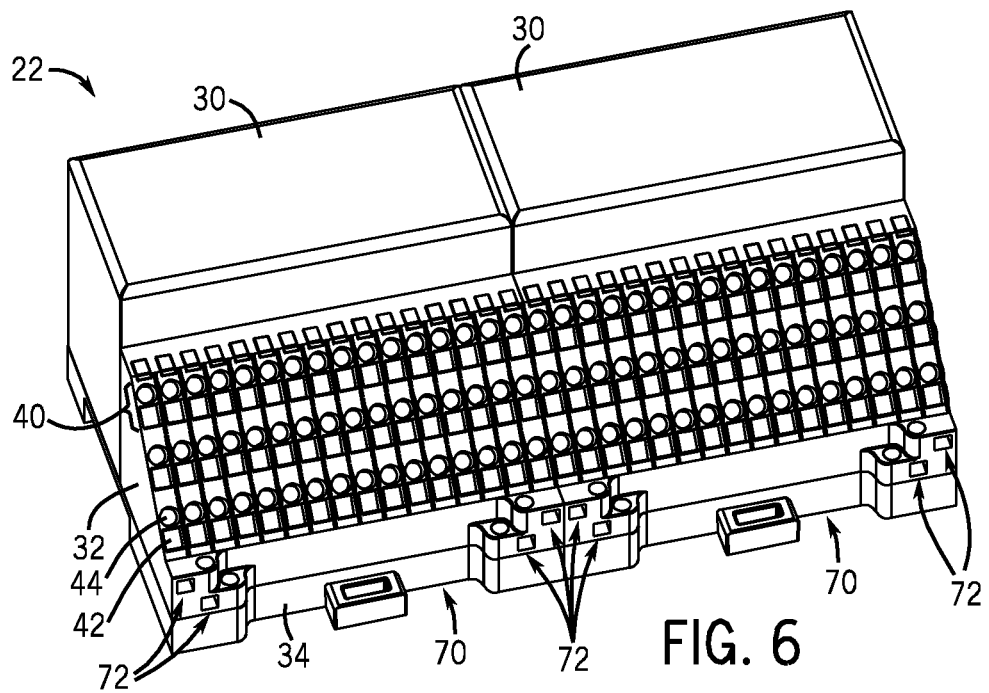
FIG. 6 is a perspective view of a plurality of I/O modules communicatively or electrically coupled to an I/O base in accordance with embodiments of the present techniques.

FIGS. 5 and 6 are perspective views of exemplary embodiments of the I/O assembly 22 having multiple power buses 46. For example, FIG. 5 illustrates the I/O assembly 22, where each terminal block 32 includes two power terminals 72. As discussed above with respect to FIG. 3, each power terminal 72 may be electrically coupled to a separate power bus 46 within the I/O assembly 22. Alternatively, each module slot 70 of the I/O base 34 may have a separate, dedicated power bus 46, as described above with respect to FIG. 4. In certain embodiments, the power buses 46 may be integrated with the I/O base 34, as described above, or the power buses 46 may be integrated with another component of the I/O assembly 22. Additionally, in the illustrated embodiment, each power terminal 72 has a respective, adjacent visual indicator 84 to provide power annunciation to a user, in the manner described above. Similarly, FIG. 6 illustrates an embodiment of the I/O assembly 22, wherein each terminal block 32 includes four power terminals 72. As will be appreciated, each power terminal 72 of each terminal block 32 may be coupled to a different power bus 46. For example, the I/O assembly 22 illustrated in FIG. 6 may include four separate power buses 46.

Figure 7:
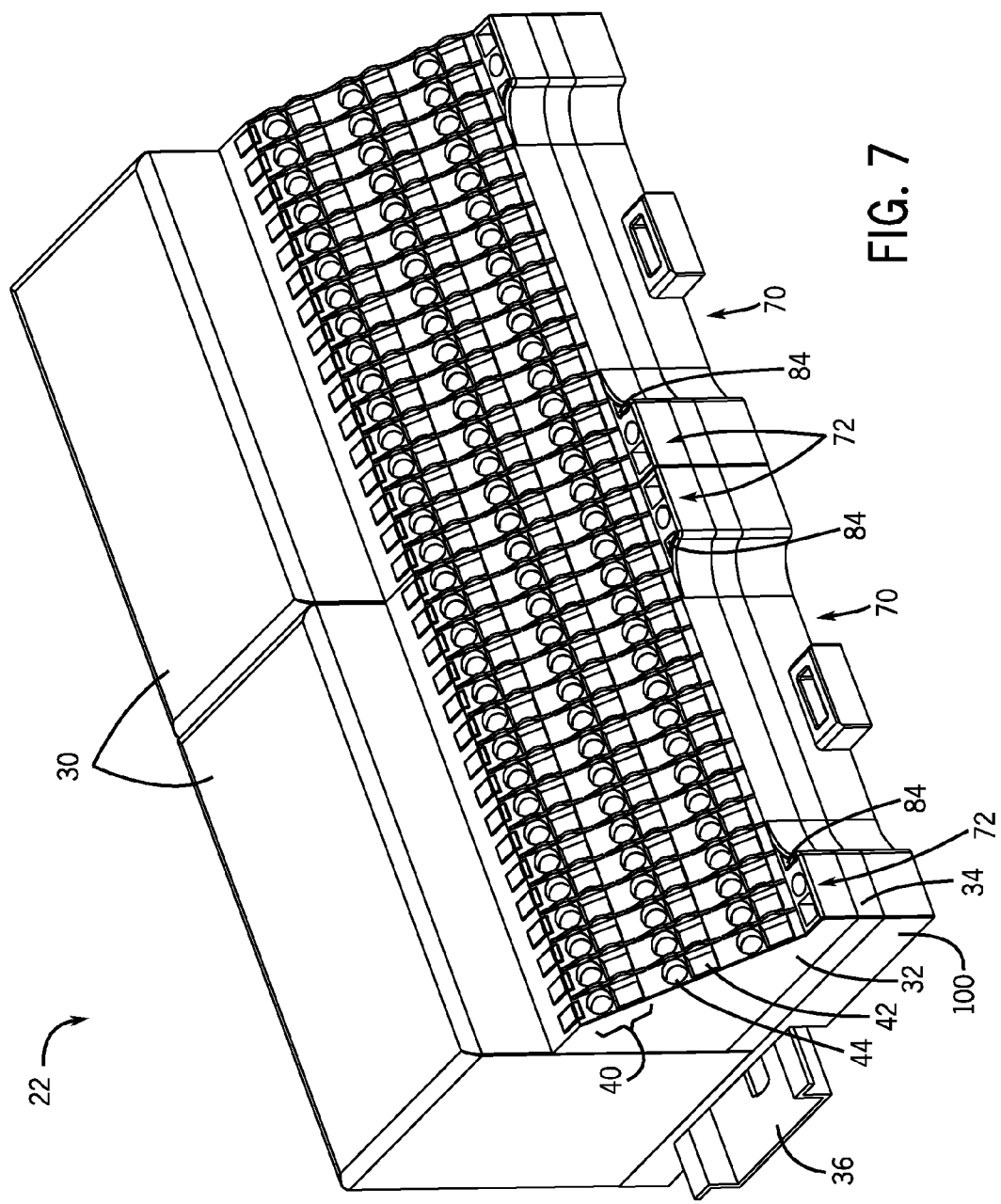
FIG. 7 is a perspective view of a plurality of I/O modules communicatively or electrically coupled to an I/O base in accordance with embodiments of the present techniques.

FIG. 7 is a perspective view of an exemplary embodiment of the I/O assembly 22 having multiple power busses 46. More specifically, the illustrated embodiment of the I/O assembly 22 includes a device 100 which includes the multiple power buses 46. In other words, the device 100 may be a junction or hub containing multiple power busses 46 and may be configured to couple with other components of the I/O assembly 22. For example, the device 100 may have a configuration similar to the I/O base 34 shown in FIGS. 3 and 4. As shown, the device 100 is communicatively coupled to the I/O base 34, which may transmit power from the multiple power busses 34 of the device 100 to the I/O modules 30. Because, in the embodiment illustrated by FIG. 7, the device 100 includes the multiple power busses 46, the I/O base 34 in the illustrated embodiment may not include multiple power buses 34. Additionally, in certain embodiments, the device 100 may be configured to couple with and transmit power to multiple I/O bases 34. Furthermore, the device 100 is also configured to couple the I/O assembly 22 to the mounting rail 36.

In certain embodiments, the device 100 may be configured for other power distribution functions. For example, the device 100 may be a power supply in which a first type of power is wired to the device 100, and the device 100 subsequently converts, creates, and/or distributes additional types of power (e.g., from the first type of power). For example, the first type of power wired to the device 100 may be supplied to a first power bus (e.g., the first power bus 50 shown in FIG. 3), and an additional type of power converted or created by the device 100 may be distributed with a second power bus (e.g., the second power bus 54 shown in FIG. 3).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An automation control device, comprising:
  a base comprising a module slot;
  a functional module including communication and control circuitry configured to communicatively couple with the base via the module slot;
  a terminal block configured to communicatively couple the base and the first functional module with field wiring;

a first power bus configured to transmit a first power to the functional module and a second power bus configured to transmit a second power to the functional module; and a first visual indicator configured to indicate a presence, type, or source of the first power and a second visual indicator configured to indicate a presence, type, or source of the second power.

2. The automation control device of claim 1, wherein the first power bus and the second power bus are integral with the base.

3. The automation control device of claim 1, wherein the base comprises a first power terminal communicatively coupled to the first power bus and a second power terminal communicatively coupled to the second power bus.

4. The automation control device of claim 3, wherein the base comprises the first visual indicator associated with the first power terminal and the second visual indicator associated with the second power terminal.

5. The automation control device of claim 1, wherein the terminal block comprises a first power terminal communicatively coupled to the first power bus and a second power terminal communicatively coupled to the second power bus.

6. The automation control device of claim 3, wherein the terminal block comprises the first visual indicator associated with the first power terminal and the second visual indicator associated with a second power terminal.

7. The automation control device of claim 1, wherein the functional module is configured to receive the first power, the second power, or both.

8. The automation control device of claim 1, comprising an additional functional module configured to communicatively couple with the base, wherein the functional module is configured to receive the first power, and the additional functional module is configured to receive the second power.

9. The automation control device of claim 1, wherein the base is configured to communicatively couple with a system bus and the first power bus is configured to receive the first power from the system bus.

10. An automation control component, comprising:
a device configured to communicatively couple with a functional module that includes communication and control circuitry;
a first power bus disposed within the device, wherein the first power bus is configured to transmit a first power;
a second power bus disposed within the device, wherein the second power bus is configured to transmit a second power; and
a first visual indicator configured to indicate a presence, type, or source of the first power and a second visual indicator configured to indicate a presence, type, or source of the second power.

11. The automation control component of claim 10, wherein the device comprises a base configured to communicatively couple with a system bus.

12. The automation control component of claim 10, wherein the first power bus is configured to transmit the first power to the functional module when the functional module is coupled with the device and accesses the first power bus, and the second power bus disposed within the device is configured to transmit the second power to the functional module when the functional module is coupled with the device and accesses the second power bus.

13. The automation control component of claim 10, wherein the device comprises a first power terminal communicatively coupled to the first power bus and a second power terminal communicatively coupled to the second power bus.

14. The automation control component of claim 13, comprising a jumper configured to communicatively couple with the first power terminal and the second power terminal and configured to transmit power from the first power bus to the second power bus.

15. The automation control component of claim 14, wherein the jumper comprises at least one additional visual indicator configured to indicate a presence, type, or source of the power transmitted from the first power bus to the second power bus.

16. The automation control component of claim 13, wherein the device comprises the first visual indicator adjacent the first power terminal and the second visual indicator adjacent the second power terminal, wherein the first visual indicator and the second visual indicator are each configured to indicate a presence, type, or source of respective power received by the first and second power terminals.

17. The automation control component of claim 11, comprising an additional functional module configured to communicatively couple with the device, wherein the functional module is configured to receive the first power transmitted by the first power bus, the second power transmitted by the second power bus, or both, and the additional functional module is configured to receive the first power transmitted by the first power bus, the second power transmitted by the second power bus, or both.

18. An automation control component, comprising:
a base configured to communicatively couple with a system bus and configured to communicatively couple with a functional module that includes communication and control circuitry;
a first functional module configured to communicatively couple with the base;
a terminal block configured to communicatively couple the base and the first functional module with field wiring;
a first power bus configured to transmit a first power to the functional module and a second power bus configured to transmit a second power to the functional module; and
a first visual indicator configured to indicate a presence, type, or source of the first power and a second visual indicator configured to indicate a presence, type, or source of the second power.

19. The automation control component of claim 18, wherein the first power bus and the second power bus are integral to the base.

20. The automation control component of claim 19, wherein the base comprises a first power terminal communicatively coupled to the first power bus and a second power terminal communicatively coupled to the second power bus, wherein the first power terminal is configured to receive the first power from a first source, and the second power terminal is configured to receive the second power from a second source.

* * * * *